US007850776B2

(12) United States Patent
Gartner et al.

(10) Patent No.: US 7,850,776 B2
(45) Date of Patent: Dec. 14, 2010

(54) HIGH BELITE-CONTAINING SULFOALUMINOUS CLINKER, METHOD FOR THE PRODUCTION AND THE USE THEREOF FOR PREPARING HYDRAULIC BINDERS

(75) Inventors: Ellis Gartner, Lyons (FR); Guanshu Li, Beijing (CN)

(73) Assignee: Lafarge, Paris (FR)

( * ) Notice: Subject to any disclaimer, the term of this patent is extended or adjusted under 35 U.S.C. 154(b) by 0 days.

(21) Appl. No.: 12/493,547

(22) Filed: Jun. 29, 2009

(65) Prior Publication Data
US 2010/0132590 A1    Jun. 3, 2010

Related U.S. Application Data

(63) Continuation of application No. 11/658,042, filed as application No. PCT/FR2005/050595 on Jul. 19, 2005, now abandoned.

(30) Foreign Application Priority Data

Jul. 20, 2004  (FR) .................................. 04 51586

(51) Int. Cl.
*C04B 7/32* (2006.01)
(52) U.S. Cl. ...................... 106/692; 106/693
(58) Field of Classification Search ................. 106/692, 106/693
See application file for complete search history.

(56) References Cited

U.S. PATENT DOCUMENTS 4,286,992 A   9/1981  Galer et al.

6,149,724 A   11/2000 Ulibarri et al.
6,537,365 B2   3/2003 Ikabata et al.

(Continued)

FOREIGN PATENT DOCUMENTS

KR          9708685          5/1997

(Continued)

OTHER PUBLICATIONS

"Generalized Bogue computations to forecast the mineralogical composition of sulfoaluminate cements based on fly ashes," J. Mailing et al., Advances In Cement Research, vol. 11, No. 1, Jan. 1999, pp. 27-34.

(Continued)

*Primary Examiner*—Paul Marcantoni
(74) *Attorney, Agent, or Firm*—Pillsbury Winthrop Shaw Pittman, LLP

(57) ABSTRACT

A sulphoaluminate clinker includes as a phasic formulation, compared with the total weight of clinker: 5 to 25% of a calcium aluminoferrite phase with a formulation corresponding to the general formula $C2AXF(1-X)$, with X comprised between 0.2 and 0.8; 15 to 35% of a calcium sulphoaluminate phase yee' limit (C4A3$); 40 to 75% belite (C2S); from 0.01 to 10% of one or several minor phases selected from the group consisting of calcium sulphates, alkali sulphates, perovskite, calcium aluminates, gehlenite, free lime and periclase, and/or a vitreous phase, and additives including at least sodium and boron present in the following quantities, by weight as compared to the total weight of the clinker: from 0.1 to 5% of sodium expressed as sodium oxide and from 0.2 to 3% of boron, expressed as boron oxide, the total content of said additives being less than or equal to 15%.

21 Claims, 1 Drawing Sheet

U.S. PATENT DOCUMENTS

| | | |
|---|---|---|
| 6,695,910 B2 | 2/2004 | Classen et al. |
| 2003/0010257 A1 | 1/2003 | Ikabata et al. |
| 2005/0126444 A1 | 6/2005 | Lopez-Gonzales et al. |
| 2006/0260513 A1 | 11/2006 | Porro Guiterrez et al. |

FOREIGN PATENT DOCUMENTS

| | | |
|---|---|---|
| RU | 2211194 C1 | 8/2003 |
| SU | 772993 B1 | 10/1980 |
| SU | 1039913 | 9/1983 |
| SU | 1456385 | 2/1989 |

OTHER PUBLICATIONS

"High-Performance Cement Matrices Based on Calcium Sulfoaluminate-Belite Compositions," F.P. Glasser et al., Cement and Concrete Research, vol. 31, No. 12, Dec. 2001, pp. 1881-1886, XP00230779.

"Investigations on Energy-Saving Cements," P. K. Mehta, World Cement Technology, May 1980, pp. 166-177, XP008044077.

Database EPODOC, European Patent Office, The Hague, May 28, 1997, XP002320783.

"Influence of C4A3S Content and W/S Ratio on The Performance of Calcium Sulfoaluminate-based Cements," J. Beretka et al., Cement and Concrete Research, vol. 26, No. 11, pp. 1673-1681, XP002320780.

Database WPI, Section CH, Week 198947, Derwent Publications Ltd., Feb. 7, 1989, XP002320784.

"Sulfoaluminate-belite Cement From Low-Calcium Fly Ash and Sulfur-Rich and Other Industrial By-Products," P. Arjunan et al., Cement and Concrete Research 1999, Elsevier Science Ltd., Exeter, vol. 29, No. 8, Jul. 5, 1998, XP002320781.

"Utilisation of Industrial Wastes And By-Products For The Synthesis of Special Cements," Resources Conservation and Recycling, Elsevier Science Publisher, J. Beretka et al., Oct. 1, 1993, vol. 9, No. 3, pp. 179-190, XP000445745.

"Lea's Chemistry of Cement and Concrete, Passage," P. C. Hewlett, Lea's Chemistry of Cement and Concrete, pp. 437-439, 442-446, XP002320782.

Database WPI, Section Ch, Week 198422, Derwent Publications Ltd., Sep. 7, 1983, XP002320785.

International Search Report for PCT/FR2005/050595.

Chae, Woo-Hyeong et al.; "Early Hydration of Modified Belite Cement Prepared by Adding Borax"; The Korean Journal of Ceramics, 2 [3], pp. 147-151, Sep. 2, 1996.

HIGH BELITE-CONTAINING SULFOALUMINOUS CLINKER, METHOD FOR THE PRODUCTION AND THE USE THEREOF FOR PREPARING HYDRAULIC BINDERS

CROSS-REFERENCE TO RELATED APPLICATIONS

This is the continuation of U.S. application Ser. No. 11/658,042 filed on Jan. 22, 2007, which is the National Phase of PCT/FR05/50595 filed on Jul. 19, 2005, which claims priority to French Application No. 0451586 filed on Jul. 20, 2004. The contents of these applications are incorporated herein in their entirety by reference.

FIELD

The present invention concerns a belite-rich sulphoaluminous clinker, a method for producing such a clinker and its use for preparing hydraulic binders.

BACKGROUND

Most modern concretes are made with hydraulic cements generally obtained from Portland cement clinkers.

Portland cement is produced by heating a fine, intimate mixture of limestone, clay, silica and iron ore, to a temperature of over 1400° C. in a rotary oven. The calcined mixture, the clinker, takes the form of hard nodules which, after cooling, are ground with calcium sulphates and other added minerals to form the Portland cement.

The mixture of raw materials put into the oven needs to be very rich in limestone in order to obtain a clinker for which the main mineral phase is alite.

Alite is an impure form of calcium trisilicate, $Ca_3SiO_5$, for which the conventional notation is C3S.

A high percentage of alite, generally over 50%, is indispensable in the mineralogical composition of modern cements, because this is what allows the strength properties to develop rapidly just after setting, and allows the strength properties at 28 days and over to develop sufficiently, in order to meet the specifications, in this area, of most cement standards.

For the remaining of the description of the invention, the following abbreviated notations will be used, unless explicitly stated otherwise, to designate the mineral components of the cement.

C represents CaO,
A represents $Al_2O_3$,
F represents $Fe_2O_3$,
S represents $SiO_2$,
$ represents $SO_3$.

Over the last decades, the level of carbon dioxide, $CO_2$, in the atmosphere has increased considerably and continues to grow increasingly rapidly. This is linked to human activity, and scientists are unanimous in recognizing that this increase will have important effects on climatic conditions in the future.

Many governments today are taking steps to reverse the trend and are studying how to reduce $CO_2$ emissions, particularly industrial emissions. The cement industry contributes greatly to these emissions, being responsible for 5% of all industrial emissions of $CO_2$.

$CO_2$ emissions in Portland cement clinker production can be reduced by about 10% if the alite is almost totally eliminated. This can be done if the quantity of limestone introduced into the oven is reduced by 10%; the quantity of $CO_2$ linked to the decarbonatation of limestone during calcination is reduced, as is the amount of fuel necessary for supplying the energy to decarbonate the limestone.

This is accompanied by a reduced oven temperature, which has advantages, as described by E. Gartner, Cement and Concrete Research, "Industrially interesting approaches to low $CO_2$ cements", 2004, article in press CEMCON-02838.

Portland cement clinkers with a low alite content are always rich in belite, an impure form of calcium disilicate, $Ca_2SiO_4$, for which the conventional notation is C2S. But the belite-rich Portland cements obtained do not make it possible to obtain sufficient mechanical strength properties in the short term to meet standard requirements, nor to obtain the performance required at present from modern concrete applications.

For these reasons the production of belite-rich Portland cement clinkers are not a satisfactory solution for reducing industrial $CO_2$ emissions by 10% or less.

In order to develop commercially useable cements, the production of which is associated with low industrial emissions of $CO_2$, it is necessary to examine other types of hydraulic cement clinkers among these, systems based on calcium aluminates and/or calcium sulphates.

Alumina-rich cements, such as "Fondu Cement" by LAFARGE, are known for their property of acquiring high resistance in the short term; but they sometimes present the well-known problem of "conversion", which is accompanied by a drop in the mechanical strength properties, and moreover highly specialised equipment is needed for their production, and a high fuel consumption, in spite of the low limestone content in the raw materials, and relatively expensive raw materials such as bauxite.

Besides, sulphate-based cements, such as gypsum and anhydrites, are inexpensive and generate little $CO_2$ during their production, but cannot be used in most concrete applications, due to their low mechanical strength properties and their poor resistance to water.

However, certain types of cements based on calcium sulphoaluminates, written as CSA, are very important because they have simultaneously the positive effects of calcium aluminates and of calcium sulphates in terms of low industrial $CO_2$ emission without having to use expensive raw materials, to the extent that the use of high quality bauxites could be minimised or be substituted by other materials.

Over the last 30 years, the Chinese cement industry has developed technology and set up a series of national standards concerning sulphoaluminous cements known as the "TCS series", described by Zang L., Su M. Z., and WONG Y. M., in the journal "Advances in Cement Research", Volume 11, no 1, 1999.

However, these cements have not been developed with the intention of reducing industrial emissions of $CO_2$; they have mainly been developed for application in which high strength had to be obtained in the short term, as for prefabrication.

These "TCS series" sulphoaluminate cements are very rich in the calcium sulphoaluminate C4A3$ phase, known as "Klein salt" or "yee' limit", which makes it possible to obtain high resistance in the short term, but in order to be formed during production, they necessitate introducing into the oven large quantities of high quality bauxite as a raw material. The cost of these cements is prohibitive for them to be used in many applications. Nevertheless, they can be produced with conventional rotary ovens.

The typical formulations of CSA aluminate cements are given in Table 1 below.

| Phases | C4A3$ (%) | C2S (%) | C4AF (%) |
|---|---|---|---|
| CSA (low ferrite content) | 55 to 75 | 15 to 30 | 3 to 6 |
| CSA (high ferrite content) | 35 to 55 | 15 to 35 | 15 to 30 |

CSA: Sulphoaluminous cement.

At the same time, P. K. Mehta in the USA developed other clinkers, the composition of which is based on the calcium sulphoaluminate phase C4A3$ "yee' limit", and described in the journal "World Cement Technology" of May 1980, pp 166-177, and the journal "World Cement Technology" of July/August 1978, pp 144-160.

The clinkers described by Mehta differ from the "TCS series" mainly by their very high free calcium sulphate content in the form of anhydrite.

Although the clinkers described by Mehta have never been marketed, the clinker #5 reference quoted seems to correspond to the requirements of low industrial emission of $CO_2$ and have performances that are roughly those of modern Portland cements.

This clinker contains 20% of C4A3$ "yee' limit", 20% anhydrite C$, 45% belite C2S and 15% tetracalcium aluminoferrite C4AF.

However, in spite of the good performances obtained in the laboratory, this clinker and the others quoted by Mehta in his publications, have the disadvantage linked to their high calcium sulphate content; indeed, it is well known that calcium sulphate is unstable at high temperatures at which it dissociates, generating a gas, sulphur dioxide $SO_2$, particularly in a reducing atmosphere or when the oxygen pressure is low, as is the case in rotary ovens. Therefore the clinkers proposed by Mehta would be difficult to produce in conventional rotary ovens without creating serious environmental problems related to the emission of sulphur dioxide $SO_2$.

The clinker #5 quoted by Mehta in the journal "World Cement Technology" of May 1980, pp 166-177 has the following mineralogical composition, by weight compared with the total weight of clinker:

C2S: 45% C4A3$: 20% C4AF: 15% C$: 20% with C$: calcium sulphate (anhydrite).

SUMMARY

It would nonetheless be desirable to have clinkers leading to reduced industrial $CO_2$ emissions during their productions, also requiring reduced energy consumption that would make it possible to give added value to industrial by-products which are not usually used as raw materials that enter into their formulation, and which at the same time would make it possible to obtain hydraulic binders with rheological and mechanical strength properties at least equal to those of conventional Portland cements, particularly as to the mechanical performance when young and the development of resistances in the medium and long term.

DETAILED DESCRIPTION

Figure 1:
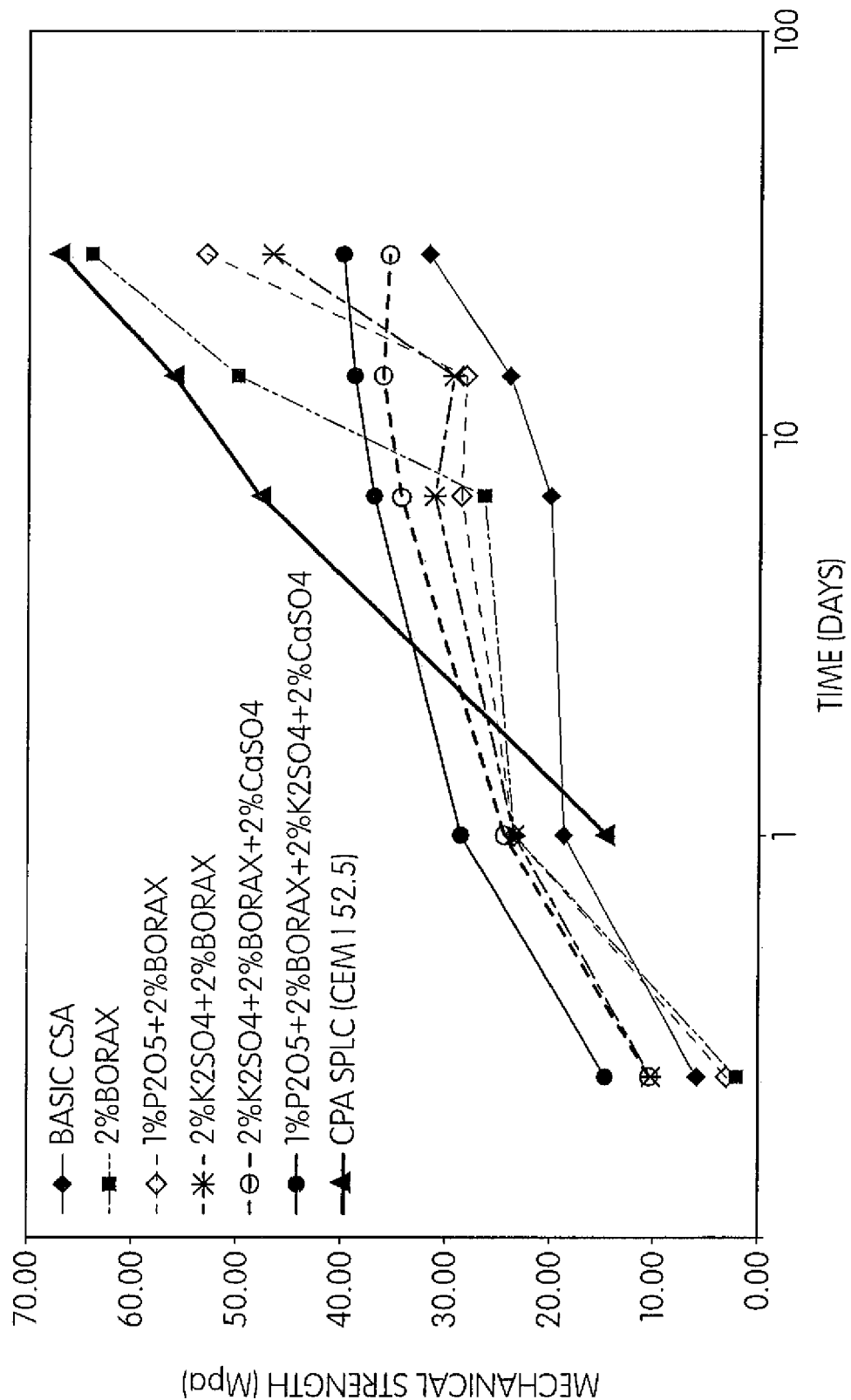
FIG. 1 presents the evolution over time of mechanical strength properties of different mortars prepared according to the invention compared to that of a reference mortar.

The aforementioned aims are met according to the invention, by a belite-sulphoaluminous clinker which has, compared with the total weight of the clinker, the following mineralogical composition:

5 to 25%, preferably 10 to 20%, of a calcium aluminoferrite phase with a formulation corresponding to the general formula C2AXF(1–X), with X comprised between 0.2 and 0.8.

15 to 35%, preferably 20 to 30%, of a calcium sulphoaluminate phase "yee' limit" (C4A3$), 40 to 75%, preferably 45 to 65% belite (C2S), from 0.01 to 10% of one or several minor phases selected from calcium sulphates, alkaline sulphates, perovskite, calcium aluminates, gehlenite, free limestone and periclase, and/or a vitreous phase such as a blast furnace slag or a hydraulic glass.

According to the invention, the clinker contains one or several secondary elements selected from among sulphur, magnesium, sodium, potassium, boron, phosphorus, zinc, manganese, titanium, fluorine, chlorine, present in the following quantities:

from 3 to 10% of sulphur expressed in sulphuric anhydride,
up to 5% of magnesium expressed in magnesium oxide,
up to 5% of sodium expressed in sodium oxide,
up to 5% of potassium expressed in potassium oxide,
up to 3% of boron expressed in boron oxide,
up to 7% of phosphorus expressed in phosphoric anhydride,
up to 5% of zinc, manganese, titanium or mixtures of these, expressed in oxides of these elements,
up to 3% of fluoride, chloride, or mixtures of these, expressed in calcium fluoride and calcium chloride,
the total content of said additives being less than or equal to 15%.

Preferably, the clinker according to the invention comprises as secondary elements in the chemical formulation:

from 4 to 8% of sulphur expressed in sulphuric anhydride,
from 1 to 4% of magnesium, expressed in magnesium oxide,
from 0.1 to 2% of sodium, expressed in sodium oxide,
from 0.1 to 2% of potassium, expressed in potassium oxide,
up to 2% of boron, expressed in boron oxide,
up to 4% of phosphorus expressed in phosphoric anhydride,
up to 3% of zinc, manganese, titanium or mixtures of these, expressed in oxides of these elements,
up to 1% of fluoride, chloride, or mixtures of these, expressed in calcium fluoride and calcium chloride.

More preferably, the clinker according to the invention comprises as secondary elements in the chemical formulation:

from 0.2 to 1% of sodium, expressed in sodium oxide,
from 0.2 to 1% of potassium, expressed in potassium oxide,
from 0.2 to 2% of boron, expressed in boron oxide,
a fluorine plus chlorine content less than or equal to 1%, expressed in calcium fluoride and chloride.

Preferably in the preferred clinker above the sodium and the potassium are both present.

The preferred element according to the invention is boron which, introduced into the raw mix in the form of borax, encourages the formation of the belite α' phase during clinkerisation.

Thus, advantageously the belite phase of the clinker is partially or totally crystallised in the α' form.

Preferably, at least 50% by weight of the belite phase of the clinker, is in the α' form.

The clinker comprises at least the following main oxides present in the relative proportions expressed in % of the total weight of the clinker:

CaO: 50 to 61%
$Al_2O_3$: 9 to 22%
$SiO_2$: 15 to 25%
$Fe_2O_3$: 3 to 11%

By comparing with the alite phase (C3S), the main component of Portland cements, a larger amount of belite phase (C2S) in the clinker is totally beneficial. It leads to the reduction of industrial emissions of $CO_2$ and of the energy consumption. Moreover, the belite contributes to the development of the long term strength of belite-sulphoaluminous cement.

The cement can be obtained by co-grinding the clinker with an adequate quantity of gypsum or other forms of calcium sulphate determined by trials or theoretical calculations. In the case where an excess of calcium sulphate is introduced into the raw mix in order to obtain anhydrite in the clinker, the cement can be prepared directly by grinding the clinker without additional gypsum added to the clinker.

These belite-sulphoaluminous cements can be used with one or several dispersing agents selected from polynaphthalene sulphonates, polymelamine sulphonates, hydroxycarboxylic acids, (poly)acrylic acids, their derivatives and corresponding salts, derivatives of phosphonic acid, and mixtures of these.

These admixtures are commercially available products. As an example, mention can be made of the products OPTIMA 100® and OPTIMA 175®, marketed by CHRYSO®.

The sulphoaluminous clinker according to the invention can advantageously comprise an accelerator or retarder for setting and/or hardening.

Another object of the invention is to provide a production method of a sulphoaluminous clinker comprising:
a) the preparation of a raw mix comprising a raw material or a mixture of raw materials able by clinkerisation to provide the phases C2AXF(1–X), with X comprised between 0.2 and 0.8, C4A3$ and C2S in the required proportions;
b) adding to and mixing into the raw mix at least one additive supplying a secondary element selected from sulphur, magnesium, sodium, potassium, boron, phosphorus, zinc, manganese, titanium, fluorine, chlorine, or mixtures of these, in quantities calculated so that, after clinkerisation, the quantity corresponding to secondary elements, expressed as indicated above, is less than or equal to 15% by weight compared with the total weight of clinker; and
c) calcinating the mixture at a temperature of 1150° C. to 1350° C. preferably from 1220° C. to 1320° C., for at least 15 minutes in an atmosphere that is sufficiently oxidising to avoid the calcium sulphate being reduced to sulphur dioxide.

Thus, the emission of $CO_2$ is decreased by more than 25% with respect to that resulting from the clinkerisation of a typical Portland cement.

The raw materials used in the production of the clinker according to the invention are selected among phosphate limestone, magnesium limestone, clays, fly ash, hearth ash, fluidised bed ash, laterite, bauxite, red mud, slag, clinker, gypsum, desulphogypsum, phosphogypsum, desulphurisation mud, industrial slag, and mixtures of these.

The additives supplying secondary elements can be raw materials themselves to the extent that they contain the required secondary elements in appropriate proportions or particular compounds of these secondary elements, for example oxides such as the oxides of sodium, potassium, magnesium, boron (particularly borax), zinc, magnesium, titanium, halides such as calcium fluoride and chloride and sulphates particularly calcium sulphate.

The term "additive supplying secondary elements" as used for the present invention is understood to mean compounds that improve the clinkerisation capacity of the mixture of raw materials, and that stabilise a required crystalline form of the phase in order to improve its reactivity.

The production of the binder, in particular of the clinker according to the invention, consists in grinding the clinker with gypsum until it is fine enough to activate its hydraulic properties. The greater the specific surface of the clinker, the better its reactivity from a hydraulic point of view.

Preferably, the clinker is ground until a Blaine specific surface of over 3000 $cm^2/g$ is obtained, advantageously over 3500 $cm^2/g$.

The binder can comprise source materials of calcium sulphate and/or calcium oxide.

Advantageously, the binder according to the invention comprises as much as 15% by weight of the total weight of the binder, of a material selected from gypsum, anhydrites and hemihydrates.

According to another advantageous embodiment, the binder according to the invention can also comprise as much as 30% by weight of binder based on the total weight, of at least one material selected from limestone, pozzolana, fly ash and blast furnace slag.

The binder according to the invention can also comprise at least one setting retarder.

Such setting retarders can be selected from gluconates, saccharides, retarders of the phosphoric acid or carboxylic acid type or mixtures of these.

Preferably, the binder according to the invention comprises at least one dispersing agent selected from polynaphthalene sulphonates, polymelamine sulphonates, hydroxycarboxylic acids, (poly)acrylic acids and their corresponding salts, derivatives of phosphonic acid, and mixtures of these.

The invention also includes the production of a slurry, a concrete or a mortar using the binder according to the invention.

The invention is illustrated by the following examples.

In these examples, and unless otherwise indicated, all quantities and percentages are expressed by weight.

EXAMPLE 1

Preparation of a Raw Mix of Sulphoaluminous Clinker

For the production of a sulphoaluminous clinker according to the invention, raw materials are used that are selected from among Orgon limestone marketed by MEAC, BS4® brand alumina-rich clay and/or BS5® brand clay that is less rich in alumina marketed by AGS-BMP, and crushed natural gypsum from Villiers. Small quantities of iron oxide or iron ore, indicated in Table 3, are also used to adjust the ferrite phase content of the clinker.

The chemical formulations of the raw materials used are given in Table 2.

TABLE 2

| % | CaO | SiO$_2$ | Al$_2$O$_3$ | Fe$_2$O$_3$ | SO$_3$ | MgO | TiO$_2$ | K$_2$O | Na$_2$O | Loss on ignition |
|---|---|---|---|---|---|---|---|---|---|---|
| Orgon fines | 55.71 | 0.01 | 0.08 | 0.03 | 0.05 | 0.19 | 0.01 | 0.01 | 0.01 | 43.67 |
| BS4 clay | 0.14 | 41.88 | 40.26 | 0.66 | 0.34 | 0.08 | 0.87 | 0.16 | 0.12 | 16.03 |
| BS5 clay | 0.38 | 51.04 | 32.78 | 1.30 | 0.20 | 0.18 | 1.33 | 1.02 | 0.08 | 11.92 |
| Gypsum | 32.68 | 1.05 | 0.15 | 0.08 | 44.64 | 0.11 | 0.02 | 0.02 | 0.02 | 21.43 |

The raw materials are dried at 100° C. for 4 hours (except gypsum), then ground so that they can be passed through a sieve with a 80 µm mesh.

The crushed and ground gypsum and the BS4 clay have been previously sieved with a 100 µm sieve before incorporating them into the mixture of raw materials.

However, all the particles with a size of over 80 µm account for less than 5% of the mixture of raw materials.

Thus the basic raw mixes are obtained by mixing together limestone, clay, gypsum and iron oxide, for example with BS4 clay following the proportions given in Table 3.

TABLE 3

| % by weight | Orgon Limestone | "BS4" clay | Villiers Gypsum | Fe$_2$O$_3$ |
|---|---|---|---|---|
| Clinker without anhydrite | 60.1 | 28.34 | 6.58 | 5.07 |

From these basic raw mixtures, different raw mixtures are produced by adding an additive or a mixture of additives selected from borax, zinc oxide, magnesium oxide and gypsum (SO$_3$). The proportions of additives are indicated in Table 4.

TABLE 4

| Raw Mix Obtained | Additive Type | % by weight | Basic raw mix (% by weight) |
|---|---|---|---|
| Basic raw mix | — | — | 100 |
| Raw mix + borax | Borax | 4.03 | 95.97 |
| Raw mix + ZnO | ZnO | 2.17 | 97.83 |
| Raw mix + MgO | MgO | 2.40 | 97.60 |
| Raw mix + SO$_4$ | Gypsum | 6.98 | 93.02 |

The raw mixes obtained are mixed and homogenised by successive dilutions.

The raw mixes obtained are then conditioned in the form of nodules using a rotary granulator until nodules are obtained with a diameter of 5 to 10 mm.

The nodules obtained in this way are placed in a oven at 100° C. for 12 hours.

EXAMPLE 2

Preparation of a Sulphoaluminous Clinker 250 g of raw mix from Table 4 are placed in crucibles with a diameter of 7 cm and a height of 10 cm.

The crucibles are first brought up to a precalcination temperature comprised between 950 and 975° C., with a rate of heat increase of about 15° C./min. The raw mix is precalcined for 30 minutes.

Then the crucibles are rapidly transferred to a high temperature oven which has previously been heated to a temperature comprised between 950 and 975° C.

The crucibles transferred in this way are brought to thermal equilibrium to be at between 950 and 975° C., then the temperature is increased by 5° C./min, until it reaches a temperature comprised between 1150 and 1350° C. during a period of time comprised between 30 and 60 minutes.

After the baking time, the clinkers obtained in this way are cooled in the open air until they reach ambient temperature.

The reduction of CO$_2$ emission during clinker production is more than 25% compared with ordinary Portland cements, as is shown in Table 5.

TABLE 5

| | Quantity of limestone needed (Kg/t clinker) | Emission of CO$_2$ from raw materials (Kg/t clinker) | % reduction of CO$_2$ |
|---|---|---|---|
| Sulphoaluminous clinker according to the invention | 880 | 387 | 26% |
| Clinker from typical Portland cement | 1200 | 528 | — |

Moreover, the low clinkerisation temperature and the use of large proportions of gypsum in these sulphoaluminous clinkers, also contribute to the reduction of the emission of CO$_2$ and the reduction of the amount of energy needed for the clinkerisation of over 20%.

EXAMPLE 3

Preparation of Sulphoaluminous Cement

The cements corresponding to the different clinkers are obtained by co-grinding, using a laboratory grinder with a capacity of 1 kg, with 8% of gypsum as a setting regulator, except for the clinker corresponding to the raw mix +SO$_4$ in Table 4 which already contains the required amount of gypsum.

EXAMPLE 4

Evaluation of the Consistent Setting Time and Mechanical Strength Properties on Mortar Using the different cements obtained from the clinkers in example 2, mortars are produced having the following composition:
500 g of cement
500 g of sand-lime with a granulometric size of 0/0.315 mm
250 g of water After successively introducing the three components into a Kenwood mixer, the mixture is mixed for 30 seconds at low speed, then for 30 seconds at high speed.

These two speeds correspond to those of a standardised mixer used for trials on mortar according to standard EN 196-1.

The mortars obtained are evaluated for their consistency and for their setting time at 20° C.

The setting tests are carried out with a Vicat device, according to standard EN 196-3.

The consistency is evaluated according to the mini-slump method described in the publication Aïtcin P. C, Jolicoeur C, and MacGregor J. G., "Superplasticizers: How they work and why they occasionally don't", Concrete International, vol, 16, no 15, 1994, pp 32-45.

Their mechanical strength properties are measured on $2*2*10$ $cm^3$ test specimens of prismatic mortar prepared at 20° C. using metal moulds and unmoulded after 6 hours or 24 hours depending on the case. The test specimens are then kept in water at 20° C. until the end of the measurement.

The resistance of the samples obtained is tested according to standard EN 196-1.

EXAMPLE 5

Comparative Tests on Samples of Mortars According to the Invention

A mortar comprising a Portland cement "Saint Pierre la Cour" (SPLC), CPA CEM I, 52, 5 according to standard EN 197-1, is produced according to the method in example 4, to be used as a comparative sample for the different tests.

The results of these tests are given in Table 6 below:

TABLE 6

| Cement | Consistency | Setting time (h) | Compression resistance at 6 h (MPa) | Compression resistance at 24 h (MPa) | Compression resistance at 28 days (MPa) |
|---|---|---|---|---|---|
| CPA SPLC | Firm | ~5.0 | 0 | 20.2 | 62.7 |
| Basic CSA | Plastic | Not measured | 14.5 | 15.0 | 27.0 |
| CSA Borax | Fluid | ~4.0 | 3.2 | 20.0 | 53.5 |
| CSA $SO_3$ | Plastic | ~3.5 | 3.8 | 18.0 | 34.0 |
| CSA ZnO | Firm | ~2.0 | 9.6 | 18.2 | 28.0 |

CPA SPLC: Saint Pierre La Cour Portland Cement
CSA: Sulphoaluminous cement
Basic CSA: Sulphoaluminous cement without additives The results obtained show that the preferred formulation CSA Borax, according to our invention, has performances comparable to those of SPLC Portland cement.

They also show the influence of the additive on the setting time and the acquisition of mechanical strength properties, particularly for the CSA Borax compound.

EXAMPLE 6

Comparative Tests

A new raw mix of basic sulphoaluminous clinker was prepared in the same way as in example 1, using the same raw materials. Starting from this basic raw mix, five modified raw mixes are produced, in the same way as in example 1, by adding a finely ground additive or mixture of additives. These additives are chemically pure compounds.

Six sulphoaluminous clinkers were prepared from the basic raw mix and from the five modified raw mixes following the operating parameters described in example 2, and using a maximum clinkerisation temperature of 1300° C. for 30 minutes.

The chemical formulations of the six CSA clinkers were determined by combining the direct ultimate analyses with calculation methods. The results are given in Table 7:

TABLE 7

Estimated formulations of clinkers expressed in % by weight of oxides

| | Cement used | CaO | Al$_2$O$_3$ | SiO$_2$ | Fe$_2$O$_3$ | SO$_3$ | MgO | TiO$_2$ | K$_2$O | Na$_2$O | P$_2$O$_5$ | B$_2$O$_3$ |
|---|---|---|---|---|---|---|---|---|---|---|---|---|
| 1 | Basic CSA | 52.5 | 16.9 | 17.6 | 7.8 | 4.5 | 0.2 | 0.4 | 0.1 | 0.1 | 0.0 | 0.0 |
| 2 | 2% Borax | 51.5 | 16.6 | 17.2 | 7.6 | 4.4 | 0.2 | 0.4 | 0.1 | 0.7 | 0.0 | 1.4 |
| 3 | 1% P$_2$O$_5$ + 2% Borax | 51.3 | 16.5 | 17.2 | 7.2 | 4.3 | 0.2 | 0.3 | 0.1 | 0.6 | 1.0 | 1.4 |
| 4 | 2% K$_2$SO$_4$ + 2% Borax | 50.8 | 16.3 | 16.8 | 7.4 | 5.1 | 0.2 | 0.3 | 1.1 | 0.6 | 0.0 | 1.4 |
| 5 | 2% K$_2$SO$_4$ + 2% Borax + 2% CaSO$_4$ | 50.9 | 16.0 | 16.5 | 7.3 | 5.8 | 0.2 | 0.3 | 1.1 | 0.6 | 0.0 | 1.4 |
| 6 | 1% P$_2$O$_5$ + 2% Borax + 2% K$_2$SO$_4$ + 2% CaSO$_4$ | 50.1 | 15.8 | 16.5 | 6.9 | 6.1 | 0.2 | 0.3 | 1.1 | 0.6 | 1.0 | 1.3 |

Entries 2 to 6 Basic CSA + additives

The clinkers obtained are then ground so as to obtain cements with a Blaine specific surface of 3800±100 cm$^2$/g, according to the method described in example 3, except that the weight of gypsum is 12% compared to the clinker in each case.

Six mortars were prepared from these six cements, and their properties were tested (consistency, setting time, mechanical strength properties) in the same way as in example 4.

As a comparison, a new batch of the same Portland cement as that used in example 5 (St. Pierre La Cour CEM I 52.5) was used for the entry 7 mortar.

The results of these mortar tests are given in Table 8 and in FIG. 1.

TABLE 8

Mechanical properties of prepared mortars

| | Cement used | Fluidity at 15 minutes | Mechanical strength properties (MPa) Time in days | | | | |
|---|---|---|---|---|---|---|---|
| | | | 0.25 | 1 | 7 | 14 | 28 |
| 1 | Basic CSA | normal | 6 | 19 | 20 | 24 | 32 |
| 2 | 2% Borax | normal | 2 | 24 | 26 | 50 | 64 |
| 3 | 1% P$_2$O$_5$ + 2% Borax | high | 3 | 23 | 29 | 28 | 53 |
| 4 | 2% K$_2$SO$_4$ + 2% Borax | fairly high | 10 | 23 | 31 | 29 | 47 |
| 5 | 2% K2SO4 + 2% Borax + 2% CaSO4 | fairly high | 10 | 24 | 34 | 36 | 36 |
| 6 | 1% P$_2$O$_5$ + 2% Borax + 2% K$_2$SO$_4$ + 2% CaSO$_4$ | normal | 15 | 29 | 37 | 39 | 40 |
| 7 | CPA SPLC (CEM I 52.5) | normal | 0 | 15 | 48 | 56 | 67 |

Entries 2 to 6: Basic CSA + additives

Table 8 and FIG. 1 show clearly that all the CSA-based cements lead to better mechanical strength properties at short times than the control Portland cement (No 7). However at 28 days, the control Portland cement leads to a slightly better mechanical strength (67 MPa) than that of the best modified CSA cement (64 MPa). Nevertheless, all the CSA cements modified by additives lead to mechanical strengths in an acceptable range for Portland cements according to European cement standards (>35 MPa).

All the mixtures produced, except for the one prepared from a mixtures of alkalis, possess an acceptable initial fluidity and setting time.

What is claimed is:

1. A sulphoaluminate clinker, comprising as a phasic formulation, compared with the total weight of clinker:
   5 to 25% of a calcium aluninoferrite phase with a formulation corresponding to the general formula C2AXF(1−X), with X comprised between 0.2 and 0.8;
   15 to 35% of a calcium sulphoaluminate phase yee' limit (C4A3$);
   40 to 75% belite (C2S), wherein C represents CaO, A represents Al$_2$O$_3$, F represents Fe$_2$O$_3$, S represents SiO$_2$ and $ represents SO$_3$;
   from 0.01 to 10% of one or several minor phases selected from the group consisting of calcium sulphates, alkali sulphates, perovskite, calcium aluminates, gehlenite, free lime and periclase, and/or a vitreous phase, and
   one or several secondary elements selected from the group consisting of sulphur, magnesium, sodium, potassium, boron, phosphorus, zinc, manganese, titanium, fluorine, chlorine, present in the following quantities:
   from 3 to 10% of sulphur expressed as sulphuric anhydride,
   up to 5% of magnesium expressed as magnesium oxide,
   up to 5% of sodium expressed as sodium oxide,
   up to 5% of potassium expressed as potassium oxide,
   up to 3% of boron, expressed as boron oxide,
   up to 7% of phosphorus expressed as phosphoric anhydride,
   up to 5% of zinc, manganese, titanium or mixtures thereof, expressed as oxides of these elements,
   up to 3% of fluoride, chloride, or mixtures thereof, expressed as calcium fluoride and calcium chloride, the total content of said one or several secondary elements being less than or equal to 15%.

2. A sulphoaluminate clinker according to claim 1, comprising one or several secondary elements in the following quantities, by weight compared to the total weight of the clinker:
   from 4 to 8% of sulphur expressed as sulphuric anhydride,
   from 1 to 4% of magnesium, expressed as magnesium oxide,
   from 0.1 to 2% of sodium, expressed as sodium oxide,
   from 0.1 to 2% of potassium, expressed as potassium oxide,
   up to 2% of boron, expressed as boron oxide,
   up to 4% of phosphorus expressed as phosphoric anhydride,
   up to 3% of zinc, manganese, titanium or mixtures thereof, expressed as oxides of these elements, and
   up to 1% of fluoride, chloride, or mixtures thereof, expressed as calcium fluoride and calcium chloride.

3. A sulphoaluminate clinker according to claim 1, comprising the following secondary elements, in the following quantities, by weight compared to the total weight of the clinker:
from 0.2 to 1% of sodium, expressed as sodium oxide,
from 0.2 to 1% of potassium, expressed as potassium oxide,
from 0.2 to 2% of boron, expressed as boron oxide, and
a fluorine plus chlorine content less than or equal to 1%, expressed as calcium fluoride and chloride.

4. A sulphoaluminate clinker according to claim 1, comprising at least the following main oxides present in the relative proportions expressed as % of the total weight of the clinker:
CaO: 50 to 61%
$Al_2O_3$: 9 to 22%
$SiO_2$: 15 to 25%
$Fe_2O_3$: 3 to 11%.

5. A sulphoaluminate clinker according to claim 1, wherein the belite phase of the clinker is partially or totally crystallised in the α' form.

6. A sulphoaluminate clinker according to claim 1, wherein the belite phase of the clinker in the α' form accounts for at least 50% by weight of the clinker.

7. A sulphoaluminate clinker according to claim 1, comprising an accelerator or retarder of setting and/or hardening.

8. A production method of a clinker according to claim 1, comprising:
a) preparing a raw mix comprising at least one raw material or a mixture of raw materials able by clinkerisation to provide the phases C2AXF(1−X), with X comprised between 0.2 and 0.8, C4A3$ and C2S;
b) adding to and mixing into the raw mix at least one additive supplying a secondary element selected from the group consisting of sulphur, magnesium, sodium, potassium, boron, phosphorus, zinc, manganese, titanium, fluorine, chlorine, or mixtures thereof, in quantities effective to provide said clinker;
c) calcining the mixture at a temperature of 1150° C. to 1350° C. for at least 15 minutes in an atmosphere that is sufficiently oxidising to avoid the calcium sulphate being reduced to sulphur dioxide.

9. A production method for a sulphoaluminate clinker according to claim 8, wherein the raw materials used in the production are selected from the group consisting of phosphate limestone, magnesium limestone, clays, fly ash, hearth ash, fluidised bed ash, laterite, bauxite, red mud, slag, clinker, gypsum, desulphogypsum, phosphogypsum, desulphurisation mud, industrial scoriae, and mixtures thereof.

10. A production method of a clinker according to claim 8, wherein the clinker obtained is then ground with or without calcium sulphate, in the form of gypsum, or hemihydrate, or anhydrite, until a Blaine specific surface of over 3000 $cm^2/g$ is obtained.

11. A hydraulic binder comprising a mixture of clinker according to claim 1 and source materials of calcium sulphate and/or calcium oxide.

12. A binder according to claim 11, comprising as much as 30% by weight of the total weight of the binder, of at least one material selected from the group consisting of limestone, pozzolana, fly ash and blast furnace slag.

13. A binder according to claim 11, comprising as much as 15% by weight of the total weight of the binder, of a material selected from the group consisting of gypsum, anhydrites and hemihydrates.

14. A binder according to claim 11, comprising at least one setting retarder selected from the group consisting of gluconates, saccharides, retarders of the phosphoric acid or carboxylic acid type or mixtures thereof.

15. A binder according to claim 11, comprising at least one dispersing agent selected from the group consisting of polynaphthalene sulphonates, polymelamine sulphonates, hydroxycarboxylic acids, (poly)acrylic acids, their derivatives and their corresponding salts, derivatives of phosphonic acid, and mixtures thereof.

16. A binder according to claim 11, wherein, in use, the binder is adapted to produce a slurry, mortar or cement.

17. A sulphoaluminate clinker according to claim 1, wherein, when added with water and mixed with source materials including at least calcium sulphate and/or calcium oxide, said clinker is adapted to provide a settable composition having a 1 day mechanical strength, as hardened, greater than about 20 MPa.

18. A sulphoaluminate clinker according to claim 17, wherein, when added with water and mixed with source materials including at least calcium sulphate and/or calcium oxide, said clinker is adapted to provide a settable composition having a 28 day mechanical strength, as hardened, greater than about 30 MPa.

19. A sulphoaluminate clinker, comprising as a phasic formulation, compared with the total weight of clinker:
5 to 25% of a calcium aluminoferrite phase with a formulation corresponding to the general formula C2AXF(1−X), with X comprised between 0.2 and 0.8;
15 to 35% of a calcium sulphoaluminate phase yee' limit (C4A3$);
40 to 75% belite (C2S), wherein C represents CaO, A represents $Al_2O_3$, F represents $Fe_2O_3$, S represents $SiO_2$ and $ represents $SO_3$;
from 0.01 to 10% of one or several minor phases selected from the group consisting of calcium sulphates, alkali sulphates, perovskite, calcium aluminates, gehlenite, free lime and periclase, and/or a vitreous phase, and
additives comprising at least sodium and boron present in the following quantities, by weight as compared to the total weight of the clinker: from 0.1 to 5% of sodium expressed as sodium oxide and from 0.2 to 3% of boron, expressed as boron oxide, the total content of said additives being less than or equal to 15%,
wherein, when added with water and mixed with source materials including at least calcium sulphate and/or calcium oxide, said clinker is adapted to provide a settable composition having a 1 day mechanical strength, as hardened, greater than about 20 MPa.

20. A sulphoaluminate clinker according to claim 19, wherein, when added with water and mixed with source materials including at least calcium sulphate and/or calcium oxide, said clinker is configured to provide a settable composition having a 28 day mechanical strength, as hardened, greater than about 30 MPa.

21. A sulphoaluminate clinker according to claim 19, wherein the additives comprise from 0.1 to 5% of potassium, expressed as potassium oxide.

* * * * *